US009477487B2

(12) United States Patent
Mehra et al.

(10) Patent No.: US 9,477,487 B2
(45) Date of Patent: *Oct. 25, 2016

(54) VIRTUALIZED BOOT BLOCK WITH DISCOVERY VOLUME

(71) Applicant: Microsoft Technology Licensing, LLC, Redmond, WA (US)

(72) Inventors: Karan Mehra, Sammamish, WA (US); Ravinder S. Thind, Sammamish, WA (US); Darren G. Moss, Redmond, WA (US); Darwin Ou-Yang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,159

(22) Filed: Oct. 7, 2015

(65) Prior Publication Data

US 2016/0026475 A1    Jan. 28, 2016

Related U.S. Application Data

(63) Continuation of application No. 13/964,984, filed on Aug. 12, 2013, now Pat. No. 9,170,824, which is a continuation of application No. 12/257,938, filed on Oct. 24, 2008, now Pat. No. 8,510,352.

(51) Int. Cl.
*G06F 9/44* (2006.01)
*G06F 17/30* (2006.01)

(52) U.S. Cl.
CPC ......... *G06F 9/441* (2013.01); *G06F 17/30067* (2013.01); *G06F 17/30138* (2013.01); *G06F 17/30218* (2013.01); *G06F 17/30233* (2013.01)

(58) Field of Classification Search
CPC ................... G06F 17/30067; G06F 17/30138; G06F 17/30218; G06F 17/30233; G06F 9/441
See application file for complete search history.

(56) References Cited

U.S. PATENT DOCUMENTS

| 5,459,867 | A | 10/1995 | Adams et al. |
| 5,613,097 | A | 3/1997 | Bates et al. |
| 5,918,047 | A | 6/1999 | Leavitt et al. |
| 5,974,547 | A | 10/1999 | Klimenko |
| 6,185,678 | B1 | 2/2001 | Arbaugh et al. |

(Continued)

FOREIGN PATENT DOCUMENTS

| WO | WO2006067783 | 6/2006 |
| WO | WO2008017938 | 2/2008 |

(Continued)

OTHER PUBLICATIONS

"Non-final Office Action Issued in U.S. Appl. No. 12/257,938", Mailed Date: Jan. 14, 2011, 23 pages.

(Continued)

*Primary Examiner* — Jorge A Casanova
(74) *Attorney, Agent, or Firm* — Sunah Lee; Dan Choi; Micky Minhas

(57) ABSTRACT

A file system independent virtualized boot block with discovery volume and cover files renders a volume visible when accessed by an accessing system which differs from a source system. For example, a downlevel operating system recognizes that data is present on a volume created in an uplevel operating system, even where the uplevel data itself may not be accessible.

20 Claims, 7 Drawing Sheets

(56) References Cited

U.S. PATENT DOCUMENTS

| | | | |
|---|---|---|---|
| 6,363,400 | B1 | 3/2002 | Chtchetkine et al. |
| 6,598,157 | B1 | 7/2003 | McKee |
| 6,952,698 | B2 | 10/2005 | Delaire et al. |
| 6,959,304 | B1 | 10/2005 | Teig et al. |
| 6,963,951 | B2 | 11/2005 | Ng et al. |
| 6,993,581 | B1 | 1/2006 | Blumenau et al. |
| 7,120,786 | B2 | 10/2006 | Miller et al. |
| 7,143,288 | B2 | 11/2006 | Pham et al. |
| 7,174,421 | B2 | 2/2007 | Ehrlich |
| 7,272,613 | B2 | 9/2007 | Sim et al. |
| 7,281,111 | B1 | 10/2007 | Blumenau |
| 7,437,387 | B2 | 10/2008 | Cohen et al. |
| 7,502,898 | B2 | 3/2009 | Blumenau et al. |
| 7,904,732 | B2 | 3/2011 | Cui et al. |
| 8,073,886 | B2 | 12/2011 | Ou-Yang et al. |
| 8,510,352 | B2 | 8/2013 | Mehra et al. |
| 2001/0014892 | A1 | 8/2001 | Gaither et al. |
| 2003/0037237 | A1 | 2/2003 | Abgrall et al. |
| 2003/0066062 | A1 | 4/2003 | Brannock et al. |
| 2003/0126426 | A1 | 7/2003 | Frye, Jr. |
| 2003/0182312 | A1 | 9/2003 | Chen et al. |
| 2004/0107422 | A1 | 6/2004 | Cabrera et al. |
| 2005/0004925 | A1 | 1/2005 | Stahl et al. |
| 2005/0228937 | A1 | 10/2005 | Karr et al. |
| 2005/0268339 | A1 | 12/2005 | Bobrow |
| 2006/0080397 | A1 | 4/2006 | Chene et al. |
| 2006/0179261 | A1 | 8/2006 | Rajan |
| 2006/0218165 | A1 | 9/2006 | Vries et al. |
| 2006/0265605 | A1 | 11/2006 | Ramezani |
| 2007/0074292 | A1 | 3/2007 | Mimatsu |
| 2007/0180239 | A1 | 8/2007 | Fujibayashi et al. |
| 2007/0206224 | A1 | 9/2007 | Nagashima et al. |
| 2008/0028008 | A1 | 1/2008 | Brunet et al. |
| 2008/0104148 | A1 | 5/2008 | Schwaab et al. |
| 2008/0115071 | A1 | 5/2008 | Fair |
| 2008/0137838 | A1 | 6/2008 | Lo |
| 2008/0147964 | A1 | 6/2008 | Chow et al. |
| 2008/0172555 | A1 | 7/2008 | Keenan |
| 2009/0067685 | A1 | 3/2009 | Boshra et al. |
| 2009/0222498 | A1 | 9/2009 | Lu et al. |
| 2010/0114990 | A1 | 5/2010 | Mehra et al. |
| 2010/0211802 | A1 | 8/2010 | Humphries et al. |
| 2010/0228797 | A1 | 9/2010 | Ou-Yang et al. |
| 2013/0339717 | A1 | 12/2013 | Mehra et al. |

FOREIGN PATENT DOCUMENTS

| | | |
|---|---|---|
| WO | WO2008051679 | 5/2008 |
| WO | WO2008127065 | 10/2008 |

OTHER PUBLICATIONS

Office action for U.S. Appl. No. 13/284,557, mailed on Mar. 18, 2016, Ou-Yang et al., "Non-Privileged Access to Data Independent of Filesystem Implementation ", 10 pages.

"70-292 Exam Study Notes", retrieved at http://www.netfresco.com/cerU70-292, Dec. 16, 2008, pp. 6.

"Digital Stick", retrieved at http://www.digitalanchor.comlDigital-Stick.aspx, Dec. 16, 2008, p. 1.

Graf, et al., "A Capability Based Transparent Cryptographic File System", retrieved on Dec. 17, 2008 at http://ieeexplore.ieee.org/stamp/stamp.jsp?arnumber=01587522, Proceedings of the 2005 International Conference on Cyberworlds (CW 2005), IEEE, Nov. 2005, 8 pages.

"Grand Stream Dreams . . . soaring up . . . chasing dreams . . . what willi do if I catch one . . . ", retrieved at http://grandstreamdreams.blogspot.com/2008/03/weekly-quality-finds-music-passwords.html, Mar. 16, 2008, pp. 4.

Halderman, et al., "Lest We Remember: Cold Boot Attacks on Encryption Keys", retrieved on May 28, 2008 at <<http://citp.princeton.edu/pub/coldboot.pdf>>, Apr. 2, 2008, revision 2.1, pp. 1-24.

McDonald, et al., "StegFS: A Steganographic File System for Linux" retrieved on May 28, 2008 at <<http://docs.ksu.edu.sa/PDF/Articles38/Article380600.pdf>>, pp. 463-477.

Office Action for U.S. Appl. No. 12/390,357, mailed on Apr. 18, 2011, Darwin Ou Yang, "Non Privileged Access to Data Independent of Filesystem Implementation", 19 pgs.

Office Action for U.S. Appl. No. 13/284,557, mailed on Jan. 2, 2015, Darwin Ou-Yang et al., "Non-Privileged Access to Data Independent of Filesystem Implementation", 20 pages.

Office action for U.S. Appl. No. 12/257,938, mailed on Oct. 24, 2012, Mehra et al., "Virtualized Boot Block With Discovery Volume", 10 pages.

Office Action for U.S. Appl. No. 12/388,811, dated Nov. 4, 2011, Russell Humphries, "Storage Volume Protection Supporting Legacy Systems", 21 pgs.

Office Action for U.S. Appl. No. 13/964,984, mailed on Dec. 29, 2014, Karan Mehra et al., "Virtualized Boot Block with Discovery Volume", 8 pages.

Office action for U.S. Appl. No. 13/284,557, mailed on Mar. 12, 2015, Ou-Yang et al., "Non-Privileged Access to Data Independent of Filesystem Implementation", 7 pages.

Office Action for U.S. Appl. No. 12/388,811, dated May 18, 2012, Russell Humphries, "Storage Volume Protection Supporting Legacy Systems", 22 pgs.

Office Action for U.S. Appl. No. 12/388,811, dated Jun. 23, 2011, Russell Humphries, "Storage Volume Protection Supporting Legacy Systems", 27 pgs.

Final Office Action for U.S. Appl. No. 12/257,938, mailed on Jun. 16, 2011, Karan Mehra, "Virtualized Boot Block With Discovery Volume", 16 pgs.

Non-Final Office Action for U.S. Appl. No. 13/964,984, mailed on Jul. 23, 2014, Karan Mehra et al., "Virtualized Boot Block with Discovery Volume", 16 pages.

Non-Final Office Action for U.S. Appl. No. 13/284,557, mailed on Jul. 3, 2014, Darwin Ou-Yang et al., "Non-Privileged Access to Data Independent of Filesystem Implementation", 7 pages.

Office action for U.S. Appl. No. 13/284,557, mailed on Aug. 28, 2015, Ou-Yang et al., "Non-Privileged Access to Data Independent of Filesystem Implementation", 7 pages.

Strunk, et al., "Self Securing Storage: Protecting Data in Compromised Systems", retrieved on Dec. 17, 2008 at http://ieeexplore.ieee.org/stamp/stamp.jsp?arnumber=01264933, Proceedings of the Foundations of Intrusion Tolerant Systems (OASIS 2003), IEEE, Dec. 2003, 15 pages.

"Translucency Overlay File System LKM", retrieved on Dec. 17, 2008 at http://sourceforge.net/projects/translucency, SourceForge.net, pp. 1-2.

"TSconnect 1.10", retrieved at http://www.itshareware.com/prodview-code_42881--download-tsconnect.htm, Dec. 16, 2008, p. 1.

Weinhold, "Design and Implementation of a Trustworthy File System for L4", retrieved on May 28, 2008 at <<http://os.inf.tu-dresden.de/papers_ps/weinhold-diplom.pdf>>, Mar. 23, 2006, pp. IX to XV and 1-74.

White, et al., "LegionFS: A Secure and Scalable File System Supporting Cross-Domain High-Performance Applications", retrieved on May 28, 2008 at <<http://citeseer.ist.psu.edu/cache/papers/cs/23870/http:zSzzSzlegion.virginia.eduzSzpaperszSzSC2001.pdf/white01legionfs.pdf>>, 10 pgs.

US 9,477,487 B2

VIRTUALIZED BOOT BLOCK WITH DISCOVERY VOLUME

CROSS REFERENCE TO RELATED APPLICATIONS

This is a continuation application which claims priority to commonly assigned, co-pending U.S. patent application Ser. No. 13/964,984, filed Aug. 12, 2013, which is a continuation of U.S. patent application Ser. No. 12/257,938, filed Oct. 24, 2008, now U.S. Pat. No. 8,510,352 Issued Aug. 13, 2013. The contents of the applications having U.S. patent application Ser. Nos. 13/964,984 and 12/257,938, as well as the contents of U.S. Pat. No. 8,510,352, are fully incorporated herein by reference in their entireties.

BACKGROUND

Access to data across multiple file systems is a significant concern for computer users. Users may encounter difficulties when trying to access file systems supported in a source system but not supported in an accessing system. For example, a source file system may incorporate features such as encryption or compression which are not recognizable by an accessing device using a different file system.

Attempts to access volumes containing a file system incompatible with the accessing device may have unintended consequences for users. The accessing system may not recognize the file system of the source system and present the volume as "raw." At the least, the accessing system may not be able to determine that data is present on that volume. At worst, an accessing system which fails to recognize the volume may prompt the user to reformat the entire volume, causing loss of the data in the volume.

SUMMARY

An original boot block (or boot sector) of a volume on a computer readable storage medium and the blocks following it are moved to another location on the volume and a discovery volume is initialized and takes their place. The discovery volume comprises a file system recognizable by a desired array of accessing devices with one or more pointers in its boot block to metadata which leads to the blocks that were relocated to accommodate the discovery volume at the beginning of the volume, and acts as an overlay for the primary file system. For example, a discovery volume using a File Allocation Table (FAT) format contains boot block entries consistent with a FAT boot block, and one or more pointers to metadata which leads to the relocated boot blocks of the primary file system on the volume.

The discovery volume may contain an information file for users alerting them to the presence of data on the volume. The discovery volume may also store driver or access software necessary for reading the primary file system on the volume. Use of an overlay comprising a commonly recognized format, for example a FAT volume, renders the primary file system on the volume independent of a source system.

Thus, when attempting to mount a disk containing a primary file system unrecognized by the accessing system, the accessing system will surface the discovery volume to the user. Based on the information presented in that discovery volume, a user may ascertain that an encrypted file system is present. Additionally, the presence of the discovery volume prevents a prompt to reformat the volume.

Data in the primary file system may be further accessed or protected using cover files. Cover files make it appear to the accessing system as though the discovery volume claims space actually used by the primary file system. Thus, while a discovery volume may actually utilize a small number of sectors on the disk, an accessing system may see the discovery volume consuming the entire space.

Virtualization of the blocks where the discovery volume resides (or boot blocks) may take place at multiple levels in the operating system concurrently.

This summary introduces the subject matter of virtualized bootblocks, described below in the Detailed Description. This summary is not intended to identify essential features of the claimed subject matter, nor is it intended for use in determining the scope of the claimed subject matter.

BRIEF DESCRIPTION OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

Initialization and use of a discovery volume are described in this specification. The data at the beginning of a volume of a computer readable storage medium is first moved to another location. A discovery volume is then written to the recently vacated space. The discovery volume boot block contains entries consistent with a file system boot block, and pointers to metadata which leads to the relocated blocks. The discovery volume may contain one or more information files describing the underlying primary file system. The information files may be visible to users and contain data which is human readable, machine readable, or both, as to the nature of the other volumes on the disk. The access software may provide for drivers, translation, decompression, decryption, etc., necessary to provide the accessing systems with the ability to read the contents of the primary volume.

In one implementation, FAT may be used. Because of the FAT format's wide support, the discovery volume would be visible across a wide range of platforms and operating systems. However, any file system may be utilized which provides the desired commonality across accessing systems.

For example, because of this commonality across accessing systems, when attempting a mount of a physical disk containing an encrypted volume by an accessing system which lacks the drivers necessary to read the encrypted data, the accessing system will still find the discovery volume accessible. Based on the information presented in that discovery volume, a user may ascertain that an encrypted volume is present. Additionally, the presence of the discovery volume prevents a prompt to reformat the volume.

Virtualization of the boot blocks may take place at one or more levels in the operating system concurrently, including at the Full Volume Encryption (FVE), write aggregator, and file system levels.

Data in the primary volume may be further protected using cover files. Cover files make it appear to the accessing system as though the discovery volume claims space actually used by the primary file system. Thus, while a discovery volume may actually utilize a small number of sectors on the disk, an accessing system may see the discovery volume consuming the entire space. Cover files may also be used to provide access to the underlying volume.

Figure 1:
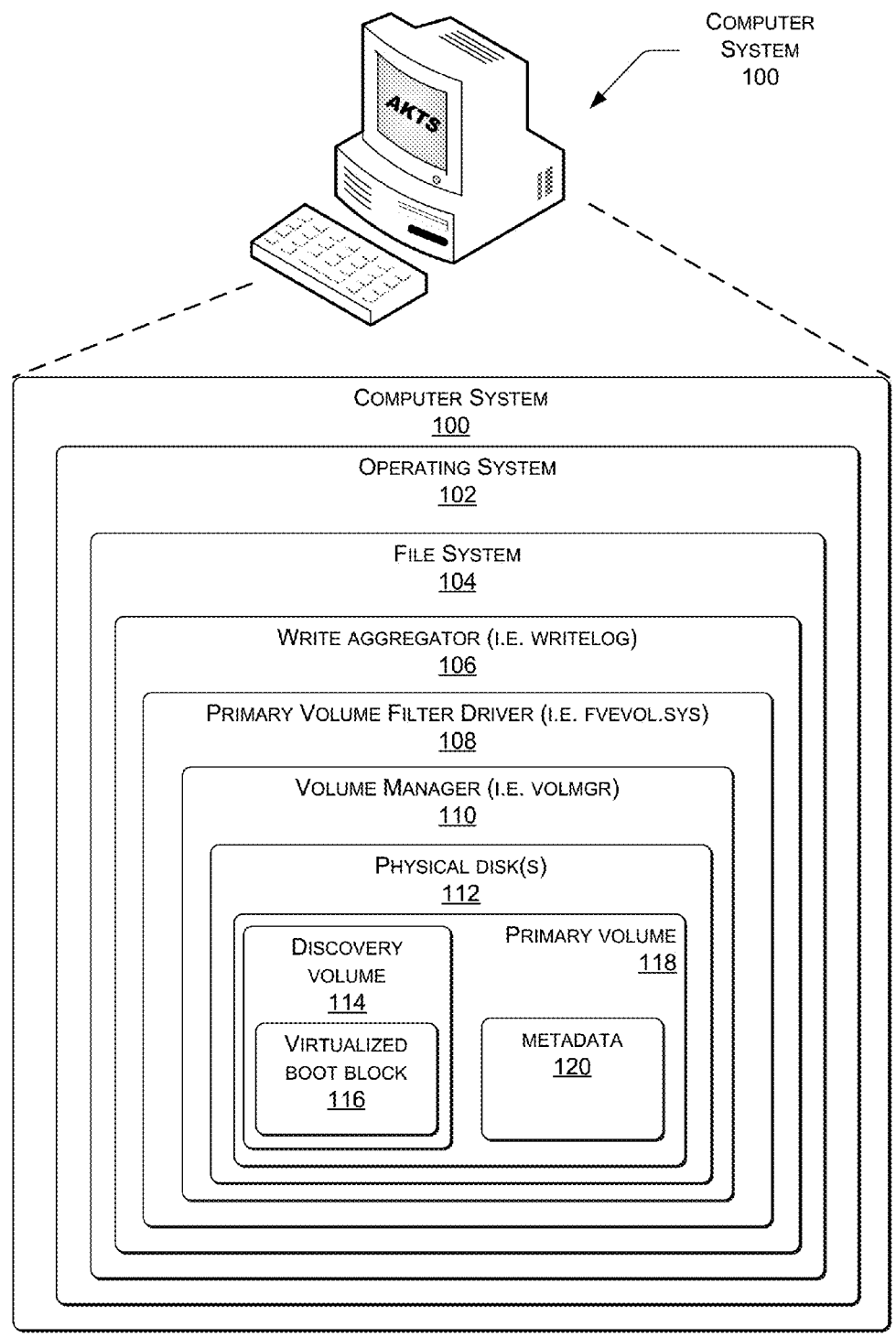
FIG. 1 is a diagram of an exemplary computer system.

FIG. 1 is a diagram of an exemplary computer system 100 which may incorporate various elements including a processor, computer readable storage media such as magnetic disks, optical disks, flash memory, random access memory (RAM), and the like.

An operating system 102 may be executed on computer system 100.

At 104, is a file system within operating system 102.

At 106, a volume filter driver may be employed. For example, the writelog.sys filter driver may be employed to perform write aggregation.

At 108, another volume filter driver may be employed. For example, the fvevol.sys filter driver may be employed to enable support of full volume encryption (FVE) including Microsoft® BitLocker™ drive encryption (BDE) made by Microsoft® of Redmond, Wash.

At 110, a volume manager such as volmgr.sys is employed to manage volumes stored on physical disks 112.

At 112, the physical disk or disks which contain the volumes managed by volume manager 110 are shown. "Disks" as used herein includes magnetic and optical disks, as well as any computer readable storage medium including optical media, magnetic media, barcodes, holographic storage, solid state memory, and the like.

A discovery volume 114 is shown on the physical disk 112 within primary volume 118. Within discovery volume 114 is a boot block 116. The discovery volume may utilize any of the desired file system implementations, including FAT12, FAT16, FAT32, exFAT, FATX, UDF, NTFS, ext2, ext4, Joliet extension to the ISO 9660 file system ("compact disk file system"), Tux3, etc. Other implementations may use other types of file systems as well.

Also within primary volume 118 is primary file system metadata 120. The primary volume may utilize any of the file systems describe above, in addition to compression, encryption, and other functions. For example, a primary volume may use full volume encryption (FVE) using BitLocker™ and a fvevol.sys filter driver.

The discovery volume may be configured to hold a selected set of files under the root directory or an equivalent data structure. These files may include the information file and accessing software discussed previously. Enforcing a read-only mount would also protect the discovery volume.

At 118, a full volume encryption (FVE) volume 118 resulting from use of BitLocker™ and the fvevol.sys filter driver is shown.

Figure 2:
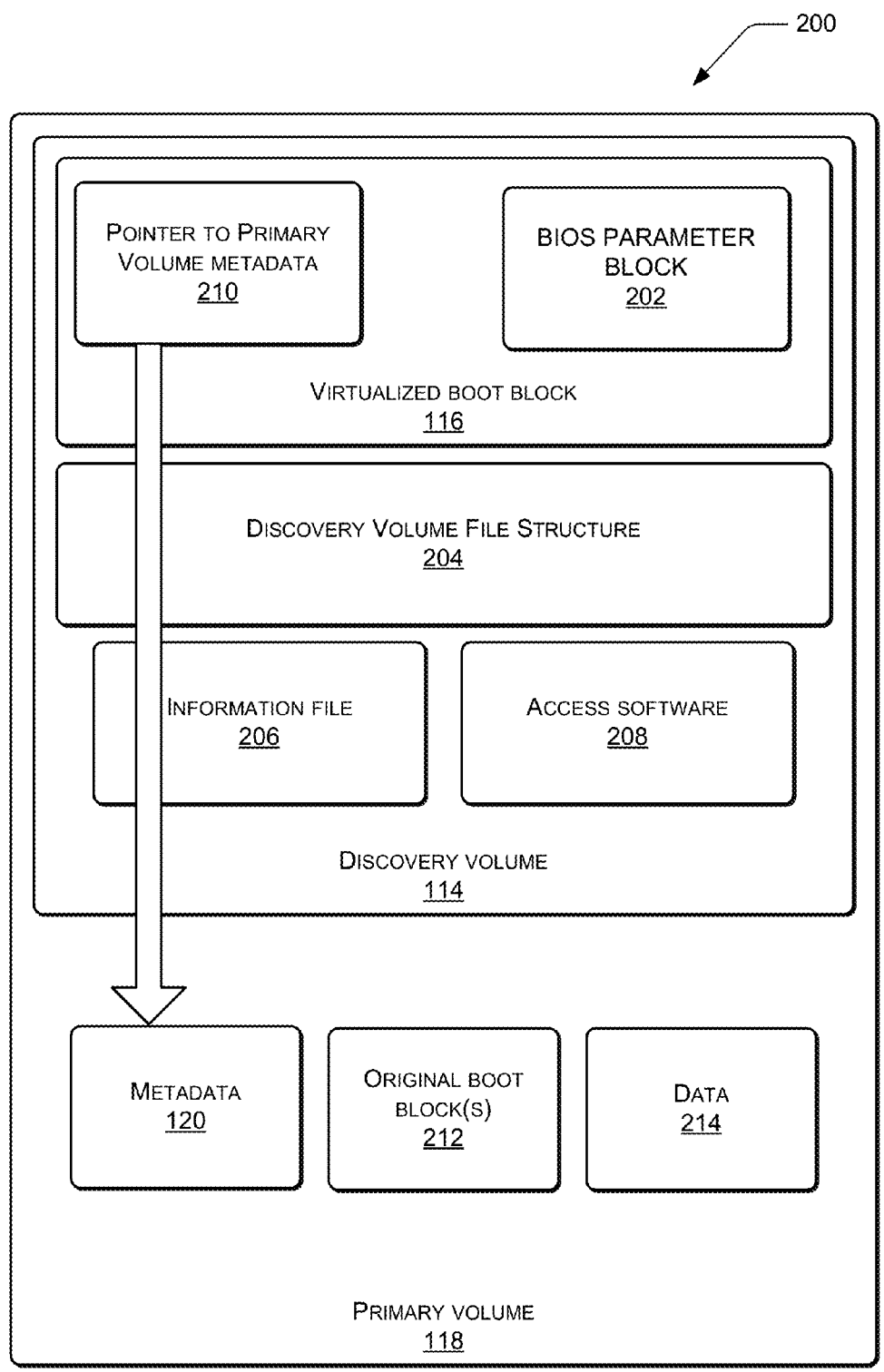
FIG. 2 is a diagram of an exemplary boot block of a discovery volume wherein the discovery volume is a FAT volume.

FIG. 2 is a diagram of an exemplary discovery volume 114 containing a virtualized boot block 116. Within the virtualized boot block 116 a BIOS parameter block may be 202 present. Also within the virtualized boot block 116 of discovery volume 114 is a pointer 210 to a metadata location 120. This pointer 210 to metadata 120 refers to the primary volume metadata 120 located within the primary volume 118. Also within the discovery volume is discovery volume file structure 204.

At 206, an information file may also be present within the discovery volume 114. This information file may be visible to users and contain human readable, machine readable, or both, information as to the nature of the other volumes on the disk. This information file may be stored in plain text, or hypertext markup language (HTML), or other suitable file format. The information file may contain a warning to users that the volume contains encrypted data, and refer them to a specific Internet address for technical support.

At 208, access software within discovery volume may be stored. The access software may provide for drivers, translation, decompression, decryption, and the like to provide accessing systems with the ability to read the contents of the primary file system on the volume.

Also within primary volume 118 are the relocated boot blocks of the primary file system 212 and data 214. Pointer to metadata 210 may also point directly to relocated boot blocks of the primary file system 212 where the component utilizing the discovery volume does not utilize metadata.

For example, where the discovery volume file structure uses a FAT format, within the boot block 116 additional information such as a complete BIOS parameter block (BPB) and associated fields may be present. Because some portions of the boot block are not critical for FAT functionality other data may be stored therein including pointers to the metadata of the component utilizing the discovery volume, such as the fvevol.sys filter driver. As a result, these fields may be used to store information necessary for the FVE volume to function while still leaving a functional FAT discovery volume.

Within the book block 116 using a FAT format, the OEM field (0x03) may be used. For convenience, the addresses for boot block fields are given as a hexadecimal number relating to their boot block locations. These offsets are given for illustrative purposes, and other offsets are possible, depending upon implementation.

When BitLocker™ is implemented in a volume, the boot block OEM string contains the value of "-FVE-FS-" which is used (for example, by Microsoft® Windows Vista®) to identify that the volume is encrypted.

When the FAT structure is in use, the boot block contains fields representing the FAT file structure within the discovery volume.

A RootDirectory (or RootEntry) field (0x11) may also be present in the virtualized boot block 116 when the FAT file structure is in use. The RootDirectory field is used to determine placement of files used for end-user information, such as a "readme.txt" file or access software.

When the FAT file structure is used by the discovery volume, the VolumeLabel field (0x2b) may be updated to contain "BitLocker," "BDE Volume" or a similar string useful to identify that an encrypted volume is present.

Figure 3:
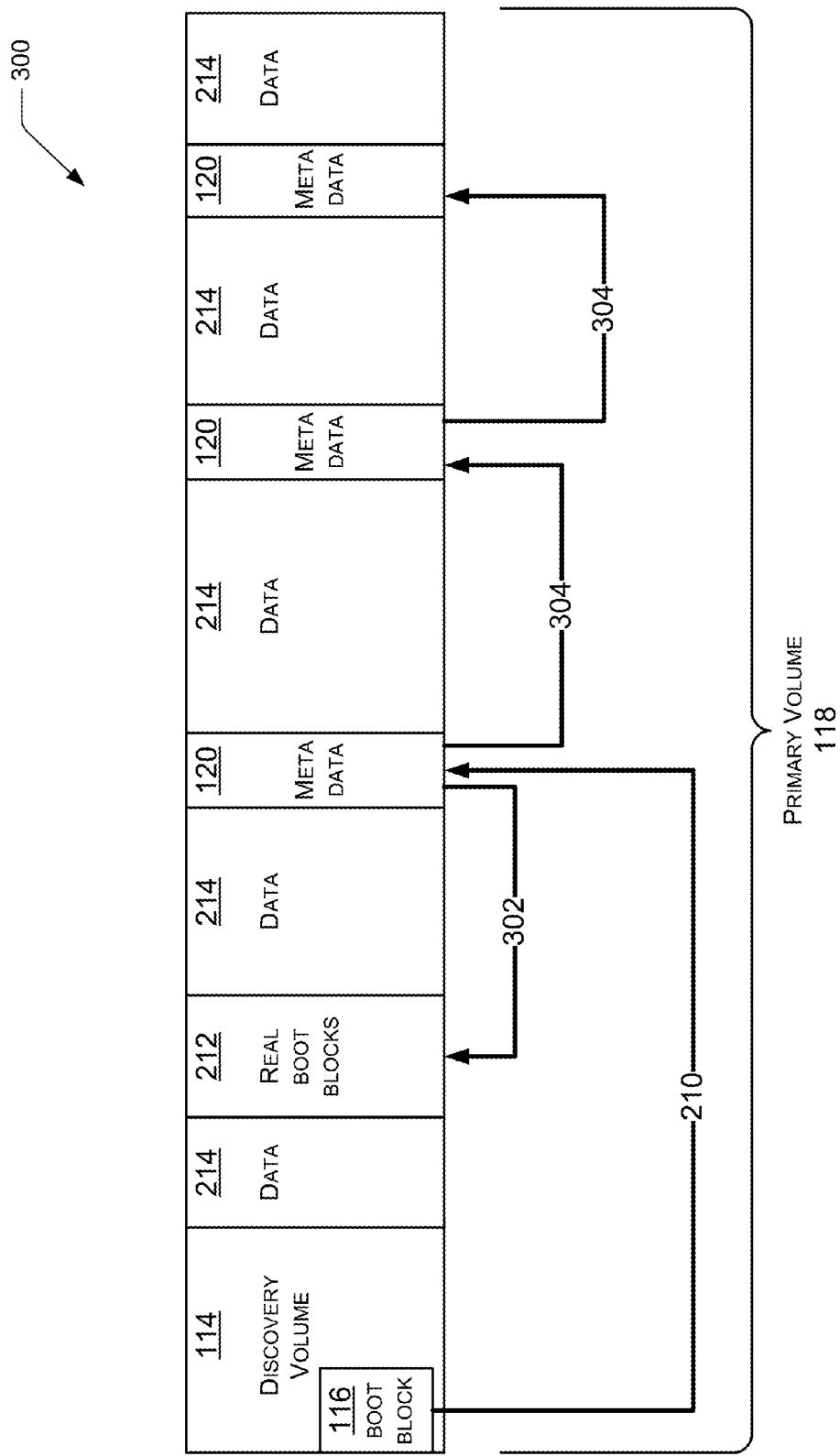
FIG. 3 is a diagram of the locations of objects by sector on a physical disk.

FIG. 3 is a diagram of the locations 300 of objects by sector on the physical disk 112. The actual locations and relative positions of objects in a volume may vary.

At 114 the discovery volume is shown with boot block 116 within. Within that boot block 116 a pointer 210 points to the metadata 120.

The metadata 120 contains a pointer 302 to the relocated real or original boot blocks 212. When the primary volume 118 uses FVE, the metadata used by BitLocker™ is generally unencrypted, although portions may be encrypted. When BitLocker™ is used, three identical copies of the metadata are stored throughout the volume for backup purposes. Because the BitLocker™ metadata locations 120 are similar to one another (for example, pointer locations to the other metadata locations may change), each will also contain a pointer 302 to the relocated boot blocks 212. For clarity, these pointers are not illustrated in FIG. 3. Also, a BitLocker™ metadata location may contain references 304 to other BitLocker™ metadata locations.

Figure 4:
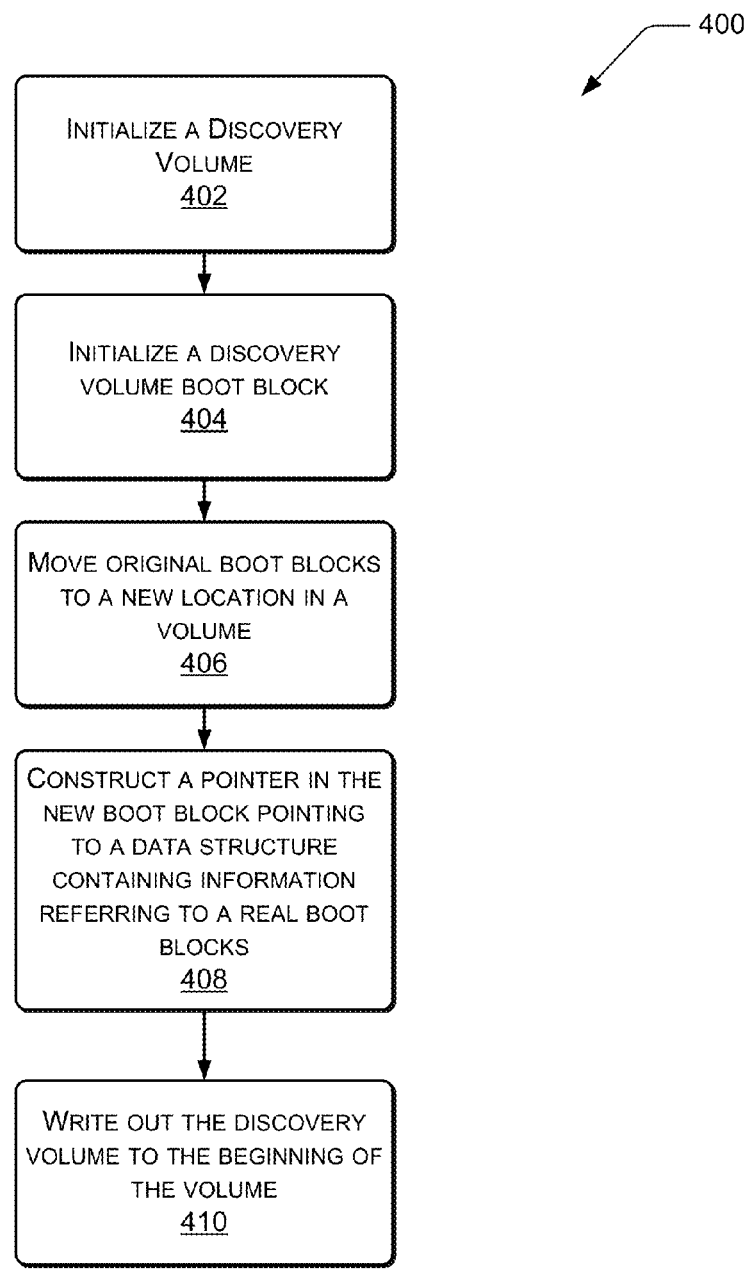
FIG. 4 is a flow diagram showing the initialization of a discovery volume.

FIG. 4 is a flow diagram showing the initialization of a discovery volume 400.

At 402, a discovery volume is initialized in memory.

At 404, a boot block is initialized within the discovery volume. For example, where FVE is used, this may be done during initialization of the BitLocker™ Drive Encryption ("BDE").

At 406, the original real boot block and the blocks following it are moved to a new location in the volume. This location may be encrypted or unencrypted. Alternately, the real boot blocks may be stored in the metadata.

At 408, a pointer is constructed in the new boot block which points to a data structure containing information referring to a real (or original) boot blocks. For example, the pointer may refer to a BitLocker™ metadata file location which in turn refers to an encrypted real boot blocks.

At 410, the discovery volume is written out to the beginning of the volume.

Figure 5:
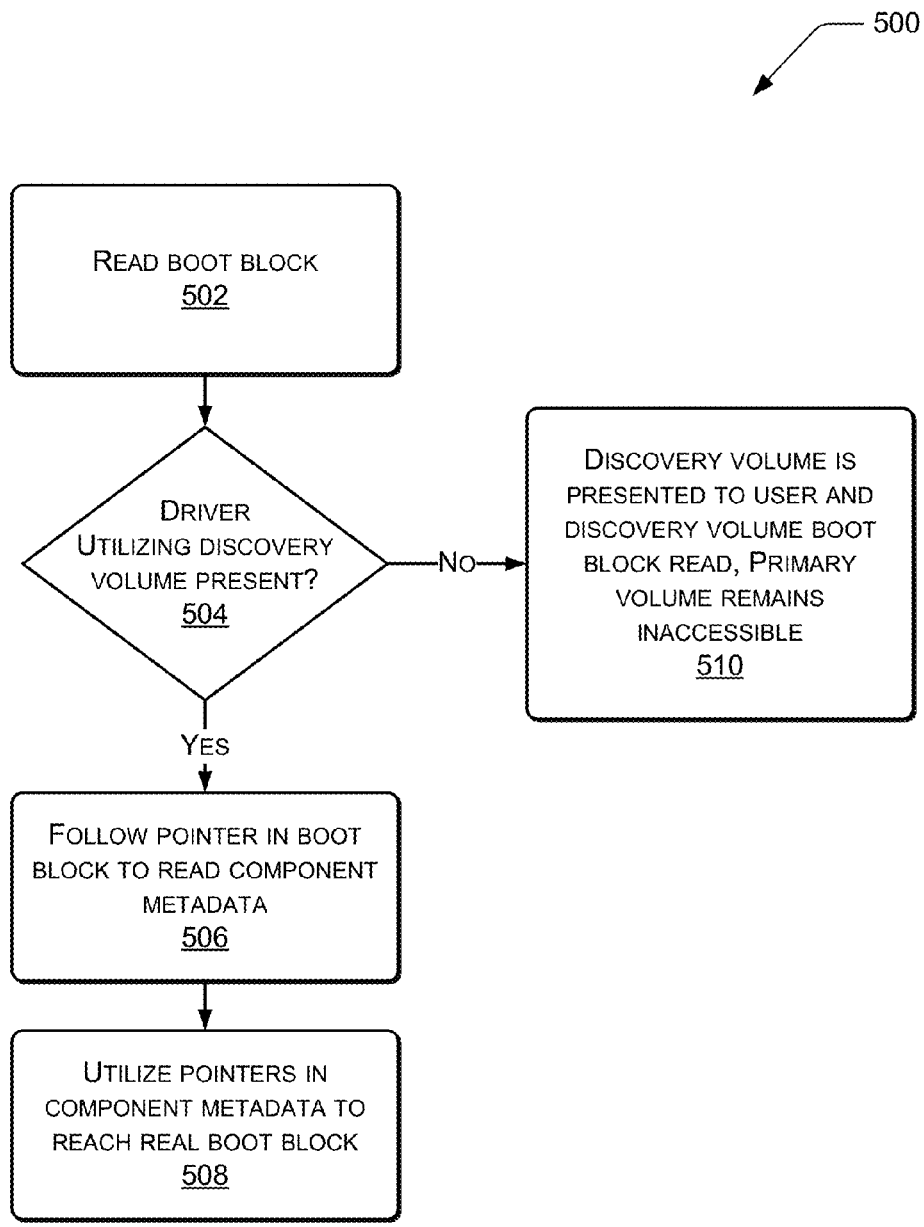
FIG. 5 is a flow diagram showing the use of the discovery volume boot block.

FIG. 5 is a flow diagram showing the use 500 of the boot block. At 502, a boot block is read by the file system.

At 504, when the driver or other software utilizing the discovery volume is present, at 506 the pointer in the boot block to metadata is followed. The metadata in 506 then refers to the real boot block, which at 508 is used to satisfy the read of the boot block by the file system. Thus, by redirecting the reads and writes for the blocks that the discovery volume occupies to the location where the real boot blocks were moved, the discovery volume becomes invisible (virtualized) and the primary file system is able to mount.

Returning to 504, when the driver or other software utilizing the discovery volume is not present, at 510 the discovery volume is presented to the user and the discovery boot block read. The primary file system remains inaccessible.

Figure 6:
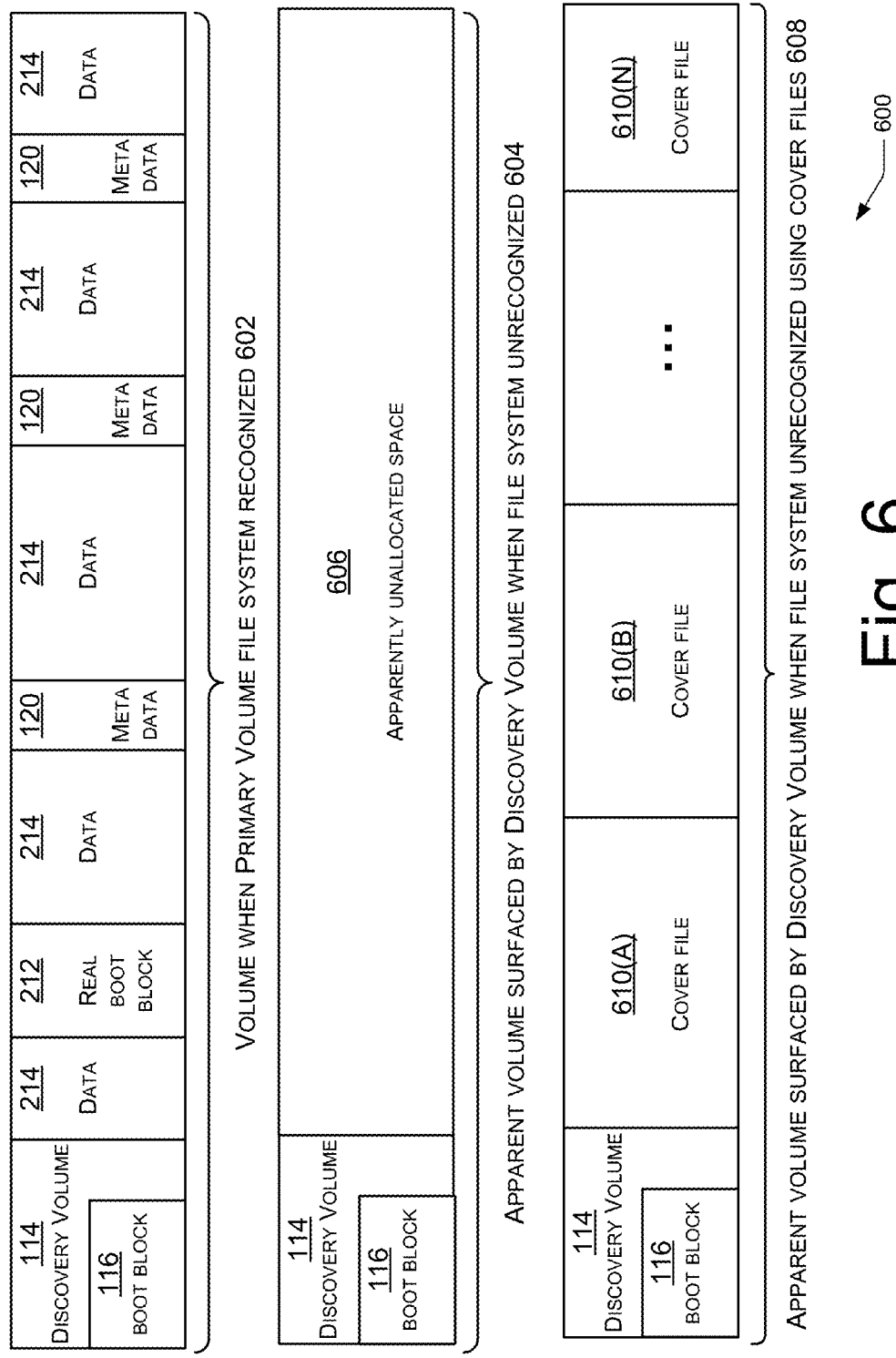
FIG. 6 is a diagram of the locations of cover files to render the drive apparently full to an operating system which cannot read the primary file system.

FIG. 6 is a diagram of cover files rendering a volume apparently full to an operating system which cannot read the primary file system.

602 depicts the volume of FIG. 3. For example, assume the volume of FIG. 3 is a primary volume comprising a BitLocker™ encrypted volume when accessed from a BitLocker™ capable operating system. The primary file system is recognized, and the data and metadata are visible and available for access.

604 depicts the volume of 602 when the primary file system is not recognized. This may occur, for example, if the Bitlocker™ encrypted volume is accessed using a computer with the Windows 98® operating system. In that case, the discovery volume 114 would be accessible, as well as the boot block 116. However, the remainder of the volume would be unreadable by Windows98® and therefore appear as apparently unallocated space 606. This unallocated space 606 may thus be erroneously viewed by the operating system as being available for reformatting or operations which could destroy the encrypted data 314 and metadata 304 which is actually present.

608 depicts the volume of 604 when cover file 610(A)-(N) entries are present in the discovery volume 114. For example, where the discovery volume uses a FAT format, cover files 610 exist as entries within the FAT file allocation table discovery volume 114. Cover files 610 appear to claim the space that would otherwise appear to the operating system as unallocated space 606. One implementation minimizes the count of cover files 610 by making as many of the cover file entries in the discovery volume as possible appear to be the maximum file size permitted by discovery volume file structure, with one cover file sized to fill any remainder of the volume. For example, if a drive is 18 gigabytes (GB), and the discovery volume file structure had a maximum file size of four GB, then four 4 GB cover files and one 2 GB cover file would appear to be on the volume.

The cover files 610 may also have attributes configured as permitted within the implementation of discovery volume file system used. For example, the cover files 610 may have read-only and system file attributes set.

Figure 7:
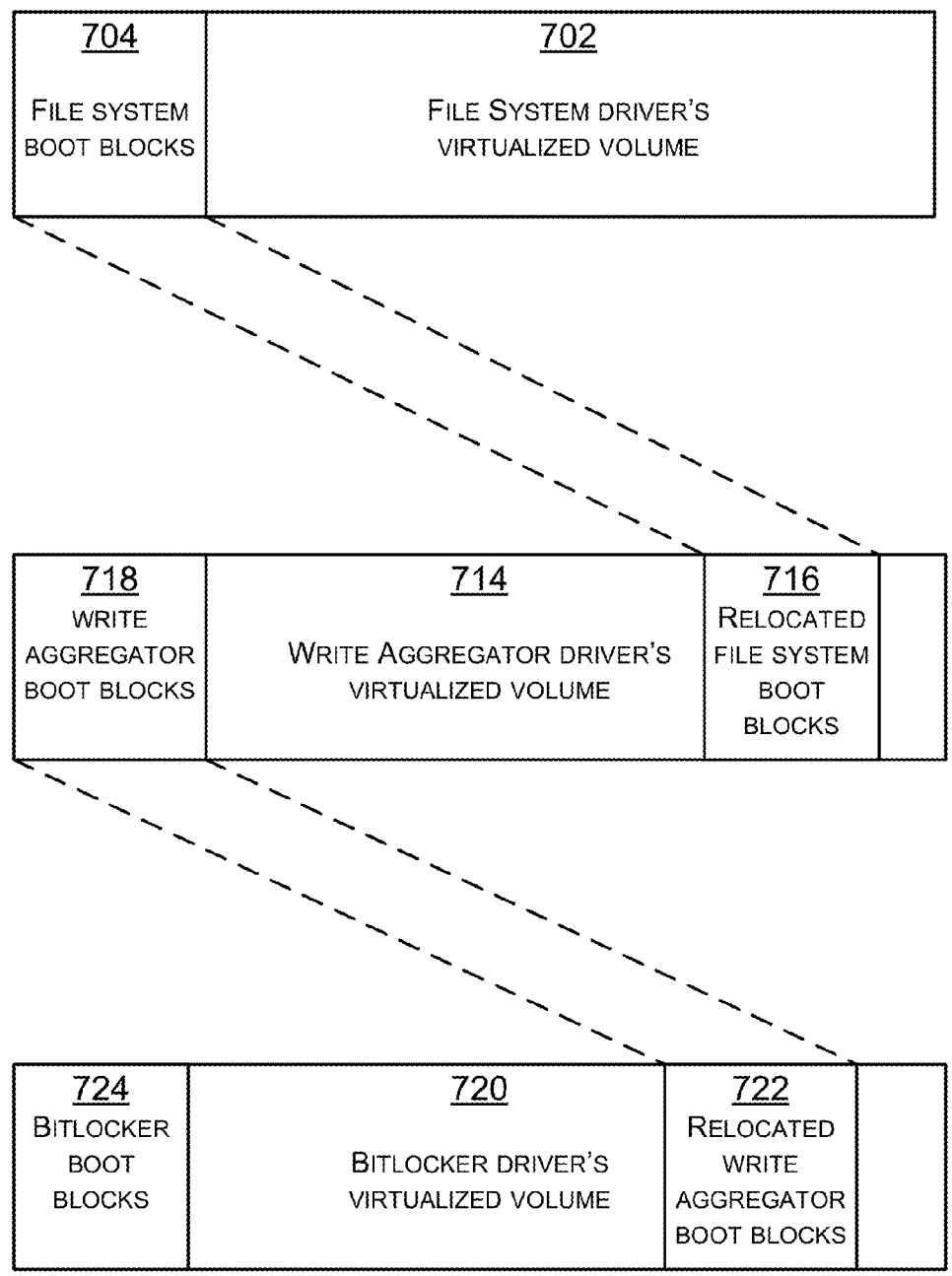
FIG. 7 illustrates one exemplary implementation of how the virtualization of the boot blocks may occur concurrently at different levels in the operating system.

FIG. 7 illustrates how the virtualization of the boot blocks may occur concurrently at different levels in an operating system 700. By implementing the virtualization of the boot blocks as a filter driver at a given level, operations at levels above and below are unaffected. Thus, the volume may be virtualized at multiple levels concurrently.

At 702, the volume as presented to the file system driver is shown. At 704, the file system boot blocks within the volume of the file system driver are shown at the beginning of the virtualized volume.

At 714, a virtualized volume shown from the perspective of a write aggregator driver is shown. At 716, within this virtualized volume is the relocated file system boot blocks. Because the boot blocks have been virtualized at this layer, they do not need to be present at the beginning of the volume, and may be within the portion of the volume normally used for data. At 718, the write aggregator boot blocks are shown.

At 720, a virtualized volume from the perspective of the Bitlocker™ full volume encryption (FVE) perspective is shown. At 722, within this virtualized volume is the relocated write aggregator boot blocks. Because the boot block has been virtualized at this layer, the boot block does not need to be present at the beginning of the volume. At 724, the Bitlocker™ boot blocks are shown. This volume 720 is synonymous with volume 118 shown in FIG. 1.

The virtualization and offsets shown above prevent the boot block of one level from colliding with the boot block virtualized on another.

FVE may be enabled on any operating system by performing the following steps:

1) FVE creates and pins the metadata files.
2) FVE creates and pins the boot blocks file.
3) FVE queues all reads/writes to the volume.
4) FVE reads the boot blocks by sending a read input/output request packet to the volume manager directly.
5) FVE backs up the boot blocks read from the volume manager.
6) FVE writes its metadata to the volume.
7) FVE writes the discovery volume to the volume.
8) FVE resumes all queued reads/writes to the volume.

CONCLUSION

Although specific details of exemplary methods are described with regard to the figures and other flow diagrams presented herein, it should be understood that certain acts shown in the figures need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

We claim:

1. A computing system comprising:
   one or more processors
   memory; and
   a plurality of programming instructions stored on the memory and executable by the one or more processors to perform acts comprising:
      moving contents of a primary boot block of a primary volume from a beginning of the primary volume to a new location in the primary volume;
      providing a discovery volume at the beginning of the primary volume, the discovery volume enforcing read-only access over at least some of a space occupied by the primary volume; and
      configuring a virtualized boot block for the discovery volume, one or more pointers in the virtualized boot block referring a boot block access request to the new location of the primary boot block for the primary volume.

2. The computing system of claim 1, wherein the primary volume is encrypted.

3. The computing system of claim 1, wherein the discovery volume is formatted according to a first file system type, and the primary volume is formatted according to a second file system type, different than the first file system type.

4. The computing system of claim 1, wherein the discovery volume includes data indicating that the discovery volume occupies the space occupied by the primary volume.

5. The computing system of claim 4, wherein the data indicating that the discovery volume occupies the space occupied by the primary volume includes entries in a file system table indicating that one or more cover files occupy some or all of the space occupied by the primary volume.

6. The computing system of claim 1, wherein the discovery volume enforcing read-only access includes data indicating that some or all the space occupied by the primary volume is read-only.

7. The computing system of claim 6, wherein the data indicating that that some or all the space occupied by the primary volume is read-only includes entries in a file system table indicating that one or more cover files in the discovery volume occupy some or all of the space occupied by the primary volume.

8. The computing system of claim 1, wherein the acts further comprise placing a driver in the discovery volume, the driver usable by an accessing computer system to access the primary volume.

9. A computing system comprising:
   one or more processors;
   memory; and
   a plurality of programming instructions stored on the memory and executable by the one or more processors to perform acts comprising:
      accessing a virtualized boot block of a discovery volume at a beginning of a primary volume on a storage media, the discovery volume enforcing read-only access over at least some of a space occupied by the primary volume;
      accessing one or more pointers in the virtualized boot block to access a primary boot block for the primary volume; and
      redirecting read to and write accesses from the discovery volume to the primary volume based at least on the one or more pointers.

10. The computing system of claim 9, wherein the primary volume is encrypted, and wherein the redirecting read to and write accesses from the discovery volume to the primary volume utilizes a driver to decrypt contents of the primary volume.

11. The computing system of claim 9, wherein the discovery volume is formatted according to a first file system type, and the primary volume is formatted according to a second file system type, different than the first file system type, and wherein the acts further comprise accessing the primary volume utilizing a driver stored on the storage media, the driver enabling access to the second file system type of the primary volume.

12. The computing system of claim 9, wherein the discovery volume includes data indicating that the discovery volume occupies the space occupied by the primary volume.

13. The computing system of claim 12, wherein the data indicating that the discovery volume occupies the space occupied by the primary volume includes entries in a file system table indicating that one or more cover read-only files occupy some or all of the space occupied by the primary volume.

14. The computing system of claim 9, wherein the discovery volume enforcing read-only access includes data indicating that some or all the space occupied by the primary volume is read-only.

15. The computing system of claim 14, wherein the data indicating that that some or all the space occupied by the primary volume is read-only includes entries in a file system table indicating that one or more cover files in the discovery volume occupy some or all of the space occupied by the primary volume.

16. A method, comprising:
   accessing a storage device;
   accessing a virtualized boot block of a discovery volume at a beginning of a primary volume on the storage device, the discovery volume enforcing read-only access over at least some of a space on the storage device occupied by the primary volume;
   accessing one or more pointers in the virtualized boot block to access a primary boot block for the primary volume; and
   redirecting read accesses and write accesses from the discovery volume to the primary volume based at least on the one or more pointers.

17. The method of claim 16, wherein the discovery volume is formatted according to a first file system type, and the primary volume is formatted according to a second file system type, different than the first file system type, and wherein the method further comprise accessing the primary volume utilizing a driver stored on the storage device, the driver enabling access to the second file system type of the primary volume.

18. The method of claim 16, further comprising accessing data on the discovery volume indicating that the discovery volume occupies the space on the storage device occupied by the primary volume.

19. The method of claim 18, wherein the data indicating that the discovery volume occupies the space on the storage device occupied by the primary volume includes entries in a file system table indicating that one or more cover read-only files occupy some or all of the space occupied by the primary volume.

20. The method of claim 16, further comprising accessing data on the discovery volume indicating that some or all the space occupied by the primary volume is read-only.

* * * * *